United States Patent Office 2,770,323
Patented Nov. 13, 1956

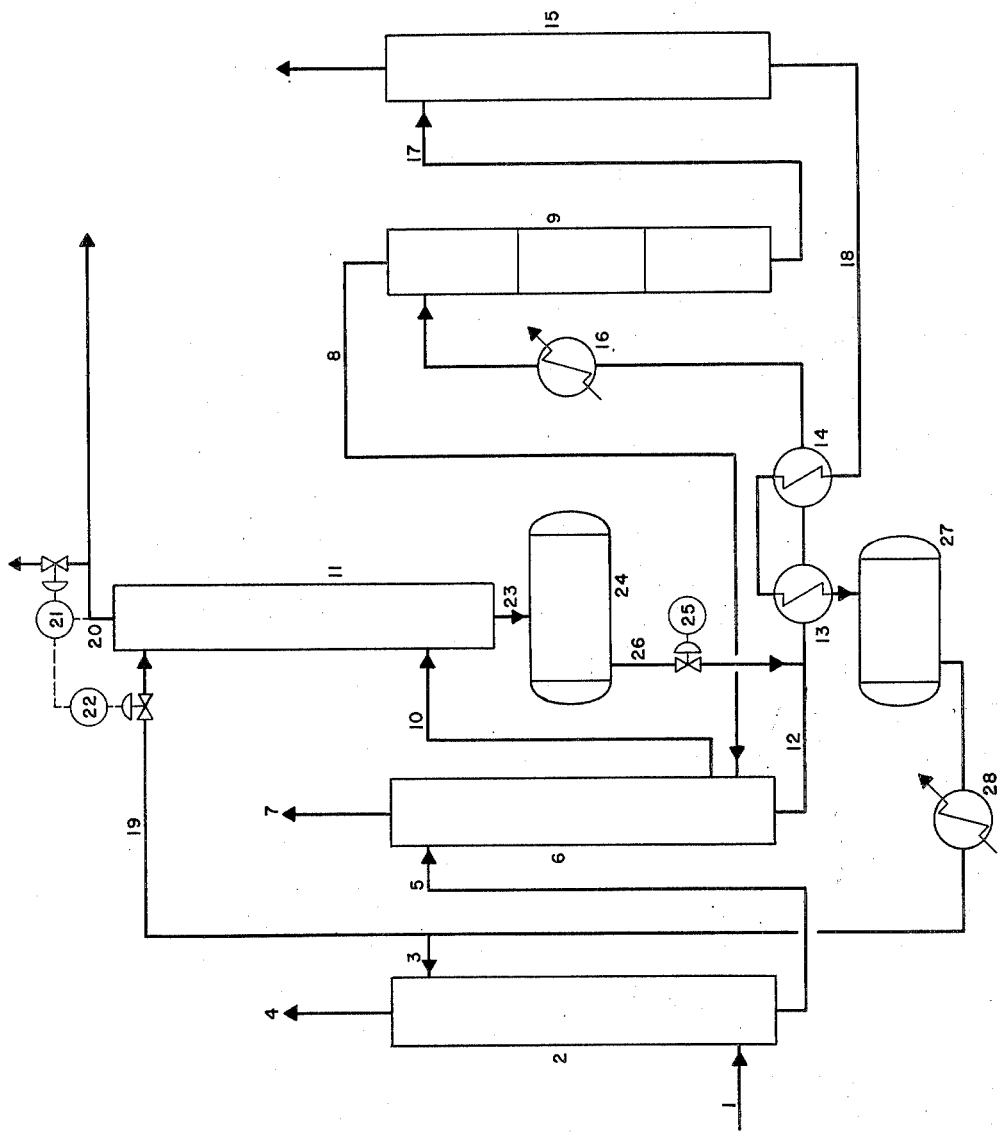

2,770,323

ACETYLENE HANDLING

Theodore Breitmayer, Texas City, Tex., assignor to Monsanto Chemical Company, St. Louis, Mo., a corporation of Delaware Application February 15, 1955, Serial No. 488,282

4 Claims. (Cl. 183—115)

The present invention pertains to the production of acetylene and more particularly to an improved acetylene recovery system.

In the usual commercial methods for the production of acetylene from hydrocarbons, the acetylene product is relatively dilute since it is admixed with other gaseous materials such as nitrogen, unreacted hydrocarbons, carbon oxides and hydrocarbon products and must be concentrated and recovered therefrom. Separation of the acetylene from such mixtures may be effected in various ways, selective solvent extraction and selective adsorption on solid adsorbents being particularly suitable. Thus the gas mixture may be countercurrently contacted with an acetylene solvent in a conventional absorption tower which may be of the packed or tray type whereby the acetylene is selectively dissolved in the solvent and the insoluble components of the gas mixture are removed from the top of the tower for disposal. The acetylene-rich solvent is then passed to stripping columns where the acetylene is recovered in substantially pure form as the primary product of the process and stored in a conventional gas holder for distribution upon demand. The lean solvent is recycled to the absorption tower for reuse. Among the wide variety of selective solvents well known to the art and satisfactory for use in such processes may be mentioned dimethylformamide, acetonitrile, various polyglycols and their esters, lactones, and certain carbonic acid esters. Solvents having high solvent power for acetylene combined with low vapor pressure are the most satisfactory.

Another commonly employed technique for recovering acetylene from gas mixtures containing it is that of selective adsorption on solid adsorbents. The best known of such techniques is that of "Hypersorption" whereby the acetylene-containing gas is passed upwardly through a bed of solid adsorbents which descends by gravity through a suitable tower under such conditions that the acetylene is preferentially adsorbed. The non-adsorbed gas passes from the top of the tower and the acetylene-rich adsorbent passes through a stripping zone where the acetylene is desorbed therefrom by steam stripping or heating. The steam is separated from the acetylene product by condensation and the adsorbent is cooled and returned to the top of the tower for reuse in adsorbing further quantities of acetylene from the feed gas. Purified acetylene passes from the top of the stripping zone and is stored in a gas holder for distribution as needed.

While such recovery systems are relatively simple and efficient, they have serious disadvantages from the standpoint of safety. Acetylene is a sensitive gas and one readily susceptible to explosive decomposition. The hazards involved in storing large quantities of high purity acetylene as in gas holders are obvious and real. It is, therefore, an object of the present invention to provide an improved process for recovery of acetylene from dilute gases containing it.

A further object of the invention is to provide an improved process for the recovery of acetylene by selective solvent extraction or selective adsorption on solid adsorbents which eliminates the hazards involved in handling and storing large quantities of high purity acetylene gas.

A still further object of the invention is to provide an improved process for the recovery of acetylene by selective solvent extraction or selective adsorption wherein acetylene is stored in solution or adsorbed on solid materials.

Other objects and advantages of the invention will become apparent from the following description and the appended claims.

According to the invention, the acetylene stream concentrated by one of the methods described above, or in some other fashion known to the art, is introduced into a scrubbing column and passes upward countercurrent to a stream of solvent introduced at the top of said column. The rate at which the purified acetylene is produced overhead from this column is controlled by varying the lean solvent rate to the column with a constant minimum solvent rate being maintained to accomplish the scrubbing required to remove heavy ends, and a rich solvent surge tank is provided as an auxiliary to the column. By means of pressure control in the overhead line any slight increase in overhead pressure, resulting either from a slight increase in acetylene production or arising from the fact that the production rate of acetylene is greater than the demand rate, acts to adjust the amount of lean solvent by admitting more of it to the column to absorb the excess acetylene. The additional rich solvent thus made is passed from the column to the auxiliary surge tank and builds up the level therein. Conversely, with a decrease in acetylene production or a demand rate greater than the production rate, the control functions in the opposite direction—the lean solvent rate to the scrubber is reduced so that less acetylene will be absorbed and more will go overhead and the level in the auxiliary surge tank will consequently drop. Thus this type of overhead control provides for smoothing out the inherent momentary fluctuation in acetylene production rates and for compensation of the mismatch at any one time between manufacturing and consumption rates, functions which are normally performed by the gas holders of the prior art. Acetylene is thus stored in solution and is not subject to explosive decomposition. Surge capacity equivalent to that of a gas holder is well within practical limits. For such a system a 30,000-gallon surge tank using butyrolactone solvent, for example, would store the same quantity of acetylene as a 40,000-cubic foot gas holder. Surge capacities in this order of magnitude are sufficient to permit time for plant adjustments to more closely match the manufacturing and consumption rates of acetylene.

The invention will be described in more detail with reference to the accompanying drawing which is a diagrammatic flowsheet of an embodiment of the invention. For purposes of simplification, the description will be presented for a solvent extraction system using butyrolactone as the solvent but it is, of course, understood that any of the solvents known to the art may be employed.

The acetylene-containing gas, compressed to about nine or ten atmospheres, is introduced through line 1 into the absorber 2. This is a column for contacting liquid and vapor either containing packing or trays of the bubble-cap, sieve, or grid type, which is maintained at a temperature of about 40° C. and a positive pressure of approximately 130 p. s. i. a. The gaseous mixture flows upward through the tower countercurrent to a descending stream of butyrolactone introduced at the top of the column through line 3. Acetylene is preferentially absorbed so that the butyrolactone reaching the bottom of the absorber is more or less saturated with acetylene under the partial pressure exerted by the acetylene gas at that level. It contains also small quantities of other constituents of the mixture such as carbon dioxide and ethylene which are somewhat less soluble than is acetylene. The least soluble or non-absorbed gases leave the top of the column through line 4 and are flared or otherwise used or disposed of.

The acetylene-rich butyrolactone stream is withdrawn from the bottom of the absorber through line 5 and is passed into the top section of the carbon dioxide desorber 6, a sieve-tray column operated at a pressure of approximately 20 p. s. i. a. and a temperature of 40° C. where it flows countercurrent to a stream of recycle acetylene entering the column at the lower level through line 8 and coming from the top of the acetylene desorber 9, the function of which will be described later. Upon entering the carbon dioxide desorber, the decrease in pressure releases carbon dioxide and some acetylene from the rich butyrolactone stream. A portion of the recycle acetylene stream entering the column through line 8 functions as a sweep gas to remove or strip out the remaining carbon dioxide in the upper part of the column. The overhead gas containing $CO_2$ and acetylene is removed from the column through line 7 and sent to the compressors for recovery of acetylene values. The major portion of the recycle acetylene vapor is contacted with downflowing solvent in the lower trays of column 6 to absorb higher acetylenes and an acetylene product stream is withdrawn through line 10 and introduced into the product scrubber 11 for final clean-up to remove most of the remaining heavy ends.

The acetylene-rich butyrolactone stream from the desorber column 6 is withdrawn from the bottom of the column through line 12, passed through the exchangers 13 and 14 in heat exchange relationship with the lean solvent coming from the solvent stripper 15 where it is heated, further heated in the solvent heater 16 and introduced into the acetylene desorber 9. In this column containing bubble-caps, sieve trays, or other liquid-vapor contacting means and operating at a pressure of approximately 1100 mm. Hg absolute, acetylene is released from the solvent. The column may be separated into several zones or stages, each operating at successively lower pressures and higher temperatures, or two or more columns may be used with the overhead from one being introduced into the other operating zone at a lower pressure or higher temperature or both. The actylene gas released in the desorber 9 contains some higher acetylenes as well and so it is recycled through line 8 back to the carbon dioxide desorber 6 where some of it is employed as a stripping gas and the higher acetylenes present are removed by absorption as described previously. The lean solvent is withdrawn from the desorber 9, or desorbers as the case may be, through line 17 and passed to a solvent stripping column where it is cleaned up and returned via line 18 and through the heat exchangers 13 and 14, the lean solvent surge tank 27, and lean solvent heater 28 to the absorber 2 to be reused in absorbing more acetylene.

The crude acetylene product stream from the desorber 6 still containing small quantities of higher acetylenes is finally scrubbed by feeding it to a final or finishing column or scrubber 11 where it flows countercurrent to a stream of butyrolactone entering at the top of the column through line 19. Purified acetylene is withdrawn overhead through line 20. A pressure recorder controller 21 of the conventional type is installed in this line to operate at a constant pressure of approximately one lb. When the pressure in the overhead line exceeds this value, the pressure controller acts to reset the flow recorder controller 22, also of conventional design, installed in the solvent line 19 to allow more solvent to enter the scrubber 11 and absorb the extra acetylene present. Rich butyrolactone flows from the bottom of the scrubbing column 11 through the line 23 into the rich solvent surge tank 24. When the pressure in the line 20 falls below one lb., the pressure controller 21 acts to set the flow control 22 on line 19 to cut back on the butyrolactone stream to permit more of the acetylene entering the column to come overhead. The acetylene-rich butyrolactone from the surge tank 24 is fed at a given rate through line 26 into the rich butyrolactone stream 12 coming from the carbon dioxide desorber 6. When the level in the surge tank 24 reaches a certain predetermined height, the flow recorder controller 25 in the line 26 is actuated to increase the rate of withdrawal of rich butyrolactone until, at another predetermined lower level, it is again reset to adjust the flow to the lower rate. Thus, the purified acetylene may be withdrawn at a wide variety of demand rates and is stored in a relatively safe fashion when demand and production rates are not equal. The capacity of the surge tank 24 is such that ample flexibility is provided to permit time for adjustment of rates of production and demand in related processes.

As an added safety precaution, the pressure controller 21 on the overhead line 20 can also be adjusted to relieve this distribution line to a flare at some predetermined maximum pressure.

The invention has been described with the final or finishing column functioning as a scrubbing column to remove higher acetylenes in addition to its primary function as a control column. It is to be understood, however, that the invention is not restricted to this specific adaptation. Any process wherein the final column and its auxiliary surge tank are employed as a control to eliminate the gasholder regardless of whether or not scrubbing of higher acetylenes is a required step therein, or whether other means are provided to effect such stripping, is contemplated as coming within the scope of the invention.

It is to be understood also that the process improvement of the invention may be adapted as well to a purification system wherein a solid adsorbent is used throughout rather than a liquid solvent. A system of purification employing solid adsorption up to the point of the product scrubber and liquid acetylene solvent in this control column is also well within the scope of the invention.

What is claimed is:

1. In a process for the recovery of acetylene from gases containing the same by selectively absorbing the acetylene in a liquid solvent in an absorption zone, withdrawing the acetylene-rich solvent from the absorption zone and passing it to a desorption zone where acetylene is released from the solvent, and recycling the solvent from which acetylene has been released for absorption of further amounts of acetylene, the improvement which comprises passing the released acetylene through a final column, provided with liquid-vapor contact means and connected to an auxiliary surge tank, where it flows upward countercurrent to a descending stream of solvent, automatically controlling the rate at which purified acetylene is produced from said final column by regulating the overhead pressure in such a manner that any increase in pressure results in an increase in solvent feed to the column to absorb the excess acetylene, the acetylene-rich solvent being passed from the bottom of said final column and stored in the connected auxiliary surge tank, and any decrease in pressure in the overhead line results in a consequent reduction in the solvent feed to said final column to permit additional purified acetylene to pass overhead.

2. In a process for the recovery of acetylene from gases containing the same by selectively absorbing the acetylene in a liquid solvent in an absorption zone, withdrawing the acetylene-rich solvent from the absorption zone and passing it to a desorption zone where acetylene is released from the solvent, and recycling the solvent from which acetylene has been released for absorption of further amounts of acetylene, the improvement which comprises passing the released acetylene upward through a finishing column, provided with liquid-vapor contact means and connected to an auxiliary surge tank, where it is scrubbed of any residual higher acetylenes by countercurrent contact with a descending stream of solvent, automatically controlling the rate at which purified acetylene is produced from the finishing column by regulating the overhead pressure in such a manner that any increase in pressure results in an increase in solvent feed to the finishing column to absorb the excess acetylene, the acetylene-rich solvent being passed from the bottom of the finishing column and stored in the connected auxiliary surge tank, and any decrease in pressure in the overhead line results in a consequent reduction in the solvent feed to the finishing column to permit additional purified acetylene to pass overhead.

3. In a process for the recovery of acetylene from gases containing the same by selectively absorbing the acetylene in a liquid solvent in an absorption zone, withdrawing the acetylene-rich solvent from the absorption zone and passing it to a desorption zone where acetylene is released from the solvent and recycling the solvent from which acetylene has been released for absorption of further amounts of acetylene, the improvement which comprises passing the released acetylene upward through a finishing column, provided with liquid-vapor contact means and connected to an auxiliary surge tank, where it is scrubbed of any residual higher acetylenes by countercurrent contact with a descending stream of solvent, automatically controlling the rate at which purified acetylene is produced from the finishing column by regulating the overhead pressure in such a manner that any increase in pressure results in an increase in solvent feed to the finishing column to absorb the excess acetylene, the acetylene-rich solvent being passed from the bottom of the finishing column and stored in the connected auxiliary surge tank, and any decrease in pressure in the overhead line results in a consequent reduction of lean solvent feed to the finishing column to permit additional purified acetylene to pass overhead, and recycling said acetylene-rich solvent from said surge tank to the desorption zone.

4. The process of claim 3 in which the solvent is butyrolactone.

References Cited in the file of this patent

UNITED STATES PATENTS

| | | |
|---|---|---|
| 2,063,680 | Isham | Dec. 8, 1936 |
| 2,600,133 | Simms | June 10, 1952 |
| 2,613,132 | Hutchinson | Oct. 7, 1952 |
| 2,714,940 | Milligan | Aug. 9, 1955 |